US009363206B2

(12) United States Patent
Ma et al.

(10) Patent No.: US 9,363,206 B2
(45) Date of Patent: Jun. 7, 2016

(54) METHOD AND APPARATUS FOR SELECTING PASSIVE PORT OF TRANSPARENT CLOCK NODE BASED ON PTP

(75) Inventors: Huayi Ma, Beijing (CN); Baihua Xue, Beijing (CN); Jianchao Huang, Beijing (CN)

(73) Assignee: KYLAND TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 14/350,021

(22) PCT Filed: May 29, 2012

(86) PCT No.: PCT/CN2012/076216
§ 371 (c)(1),
(2), (4) Date: Mar. 9, 2015

(87) PCT Pub. No.: WO2013/174025
PCT Pub. Date: Nov. 28, 2013

(65) Prior Publication Data
US 2015/0229587 A1   Aug. 13, 2015

(30) Foreign Application Priority Data

May 25, 2012   (CN) .......................... 2012 1 0168427

(51) Int. Cl.
| H04L 1/00 | (2006.01) |
| H04L 12/935 | (2013.01) |
| H04L 29/06 | (2006.01) |
| H04J 3/06 | (2006.01) |
| H04L 12/937 | (2013.01) |

(52) U.S. Cl.
CPC ........... *H04L 49/3009* (2013.01); *H04J 3/0641* (2013.01); *H04L 49/254* (2013.01); *H04L 69/28* (2013.01); *H04J 3/0667* (2013.01)

(58) Field of Classification Search
CPC ......... H04L 45/48; H04L 45/49; H04L 45/50; H04L 45/51; H04L 45/02; H04L 45/03; H04L 45/04; H04L 45/05; H04L 45/06; H04W 56/00; H04W 56/01; H04W 56/02; H04W 56/03; H04J 3/0638; H04J 3/0639; H04J 3/064; H04J 3/0641; H04J 3/00
USPC .................. 370/252, 254–256, 350, 503, 419
See application file for complete search history.

(56) References Cited

U.S. PATENT DOCUMENTS 8,472,346 B1 *   6/2013   Bahadur ............. H04L 43/0811
                                                          370/254
9,137,119 B2 *   9/2015   Yang ....................... H04L 41/12

FOREIGN PATENT DOCUMENTS

| CN | 101170373 A | 4/2008 |
| CN | 101207606 A | 6/2008 |
| CN | 101399655 A | 4/2009 |
| CN | 102026364 A | 4/2011 |
| CN | 102195996 A | 9/2011 |
| WO | WO 2012/016507 A1 | 2/2012 |

* cited by examiner

*Primary Examiner* — Dady Chery
(74) *Attorney, Agent, or Firm* — TIPS Group (57) ABSTRACT

Provided are a transparent clock passive port election method and device based on the PTP protocol. In the method, by extracting the TLV field of a received announce message, a first port of a network device acquires the clock identification information, forwarding times information and port identification information carried in the TLV field, and then compares the forwarding times information and clock identification information carried in the TLV field to the forwarding times information carried in the TLV field contained in a received announce message from a port by itself, and its own clock identification information, so as to select a port as a passive port. Therefore, by adding the comparison factors, such as clock identification information, forwarding times information and port identification information, in the TLV field of an announce message, a transparent clock is allowed to support the PTP protocol, thus avoiding a protocol storm formed by a PTP message in a complex topology network and a ring network constituted by the transparent clock to improve the stability of the network.

12 Claims, 4 Drawing Sheets

METHOD AND APPARATUS FOR SELECTING PASSIVE PORT OF TRANSPARENT CLOCK NODE BASED ON PTP

The present application is a US National Stage of International Application No. PCT/CN2012/076216, filed May 29, 2012, designating the United States, and claiming priority to Chinese Patent Application No. 201210168427.3, filed with the Chinese Patent Office on May 25, 2012 and entitled "method and apparatus for selecting passive port of transparent clock node based on PTP", which is hereby incorporated by reference in its entirety.

FIELD OF THE INVENTION

The present invention relates to the field of Precision Time Protocol (PTP) technologies in network transmission and particularly to a method and apparatus for selecting a passive port of a transparent clock node based on PTP.

BACKGROUND OF THE INVENTION

Along with rapid development of computer networks, more stringent time synchronization has been required in an increasing number of industrial fields, and time synchronization at a sub-microsecond level has been required especially in the majority of industrial Ethernet-based distributed control systems. Particularly, in a smart substation automation system and distributed control system, higher time uniformity may be required in view of real-time data collection, scheduling and control.

A precision synchronization clock protocol relating to network communication, local computation and object allocation in a test and control network has been defined in the IEEE-1588 Precision Time Protocol (PTP). This protocol supporting system-wide time synchronization can be applicable to both a wide area Ethernet and a multipoint transmission-enabled local area network and can achieve the time synchronization precision at a sub-microsecond level. The IEEE-1588 precision time synchronization algorithm has been widely applied in power supply management, industrial control, test and measurement, network communication and other fields due to its high synchronization precision, low-cost implementation, convenience to deploy and maintain and other superiorities.

The currently used PTP version is generally the IEEE1588V2 version with an additional support of a transparent clock comparing to the V1 version to thereby further alleviate the difficulty to implement IEEE1588 and improve the stability and the time synchronization precision of IEEE1588, and particularly for the network node run on transparent clock protocol (that is transparent clock node), it is more appropriate to transport the clock information in a switch system.

During existing network deployment, if a complex topology network or a loop network is deployed across a plurality of transparent clock nodes, then a transparent clock node performs only frequency synchronization upon a received PTP packet without phase synchronization, and a transparent clock node forwards the PTP packet simply after performing tome process on the received PTP packet, so there may be a protocol storm in the loop network due to the PTP packets and consequently time synchronization cannot be performed in the network.

In the prior art, there is such a solution to this problem that whether to forward a PTP packet is determined by a port status of a spanning tree, and this solution can address the problem of transparent time synchronization in a network with a spanning tree, but a device, for which there are a plurality of spanning trees and a network is deployed with routing, can not judge, or can not judge purely, from the status of a port spanning tree, whether to forward a transparent clock packet and consequently the PTP may fail.

SUMMARY OF THE INVENTION

In view of this, the invention provides a method and apparatus for selecting a passive port of a transparent clock node based on PTP so as to address the problem of a protocol storm due to PTP packets in a PTP-disabled complex topology network or loop network including a plurality of transparent clock nodes.

The invention provides a method for selecting a passive port of a transparent clock node based on PTP, including:

a port of a network device receiving an Announce packet transmitted from another network device, extracting a TLV field of the Announce packet, and obtaining clock identifier information, number-of-forwarding information and port identifier information carried in the TLV field, wherein the network device are provided with at least two ports;

judging whether the port of the network device is a slave port;

if it is judged that the port of the network device is not a slave port, comparing the number of forwarding carried in the TLV field received via the port of the network device with the number of forwarding carried in a TLV field received via the slave port of the network device, and if it is judged that the absolute value of the difference between the number of forwarding carried in the TLV field received via the port of the network device and the number of forwarding carried in the TLV field received via the slave port is 0 or 1, selecting a port with the lowest priority as the passive port; and if the port of the network device is a slave port or the absolute value of the said difference between the numbers of forwarding is not 0 or 1, updating clock identifier information of the network device and port identifier information of an Announce packet forwarding port of the network device into the TLV field of the received Announce packet respectively as clock identifier information and port identifier information, and forwarding the updated Announce packet via the Announce packet forwarding port after incrementing the number of forwarding of the Announce packet by one.

The invention provides an apparatus for selecting a passive port of a transparent clock node based on PTP, including:

a receiving and extracting module configured for a port of a network device to receive an Announce packet transmitted from another network device, to extract a TLV field of the Announce packet, and to obtain clock identifier information, number-of-forwarding information and port identifier information carried in the TLV field;

a judging module configured to judge whether the port of the network device is a slave port;

a comparing and selecting module configured, if it is judged that the port of the network device is not a slave port, to compare the number of forwarding carried in the TLV field received via the port of the network device with the number of forwarding carried in a TLV field received via the slave port of the network device, and to select a port with the lowest priority as the passive port upon judging that the absolute value of the difference between the number of forwarding carried in the TLV field received via the port of the network device and the number of forwarding carried in the TLV field received via the slave port is 0 or 1; and an updating and forwarding module configured, if the port of the network device is a slave port or the absolute value of the said difference between the numbers of forwarding is not 0 or 1, to update clock identifier information of the network device and port identifier information of an Announce packet forwarding port of the network device into the TLV field of the received Announce packet respectively as clock identifier information and port identifier information, and to forward the updated Announce packet via the Announce packet forwarding port after incrementing the number of forwarding of the Announce packet by one.

The invention provides a method and apparatus for selecting a passive port of a transparent clock node based on PTP, and a first port of a network device in the method receives an Announce packet transmitted from another network device, extracts a TLV field of the Announce packet, and obtains clock identifier information, number-of-forwarding information and port identifier information carried in the TIN field; judges whether the first port is a slave port; if it is judged that the first port is not a slave port, the number of forwarding carried in the TLV field received via the first port is compared with the number of forwarding carried in a TLV field received via its own slave port, and if it is judged that the absolute value of the difference between the number of forwarding carried in the TLV field received via the first port and the number of forwarding carried in the TLV field received via the slave port is 0 or 1, a port with the lowest priority is selected as the passive port; and if the first port is a slave port or the absolute value of the difference between the numbers of forwarding is not 0 or 1, its own clock identifier information and port identifier information of its own Announce packet forwarding port are updated into the TLV field of the received Announce packet, and the updated Announce packet is forwarded via the Announce packet forwarding port after the number of forwarding of the Announce packet is incremented by one.

A first port of a network device in the invention extracts a TLV field of a received Announce packet and obtains clock identifier information, number-of-forwarding information and port identifier information carried in the TLV field; and compares the number-of-forwarding information and the clock identifier information carried in the TLV field with number-of-forwarding information carried in the TLV field included in an Announce packet received via its own slave port and the clock identifier information of the network device to thereby select a port with the lowest priority as the passive port, so the clock identifier information, the number-of-forwarding information and the port identifier information are added to the TLV field of the Announce packet as comparison factors to enable a transparent clock node to support the PTP so as to avoid a protocol storm in a complex topology network or loop network including transparent clock nodes due to the PTP packets and improve the stability of the network.

BRIEF DESCRIPTION OF THE DRAWINGS

The drawings described here serve to provide further understanding of the invention and constitute a part of the invention, and exemplary embodiments of the invention and their description are intended to explain the invention but not to limit unduly the invention. In the drawings.

DETAILED DESCRIPTION OF THE EMBODIMENTS

In order to make the technical problem to be addressed by the invention and the technical solution and advantageous effects of the invention more apparent, the invention will be further described below in details with reference to the drawings and embodiments. It shall be appreciated that the particular embodiments described here are only intended to explain the invention but not to limit the invention.

In a complex topology network or a loop network including a plurality of transparent clock nodes, a transparent clock node performs only frequency synchronization upon a received PTP packet without phase synchronization, and a transparent clock node forwards the received PTP packet simply after performing some process on the received PTP packet, so there may be a protocol storm in the loop network due to the PTP packets, and in order to address such a problem, embodiments of the invention provide a method and apparatus for selecting a passive port of a transparent clock node based on PTP, where an Announce packet is extended to enable the transparent clock node to support the PTP so as to avoid a protocol storm due to the PTP packets and improve the stability of the network.

The embodiments of the invention will be described below in details with reference to the drawings.

Figure 1:
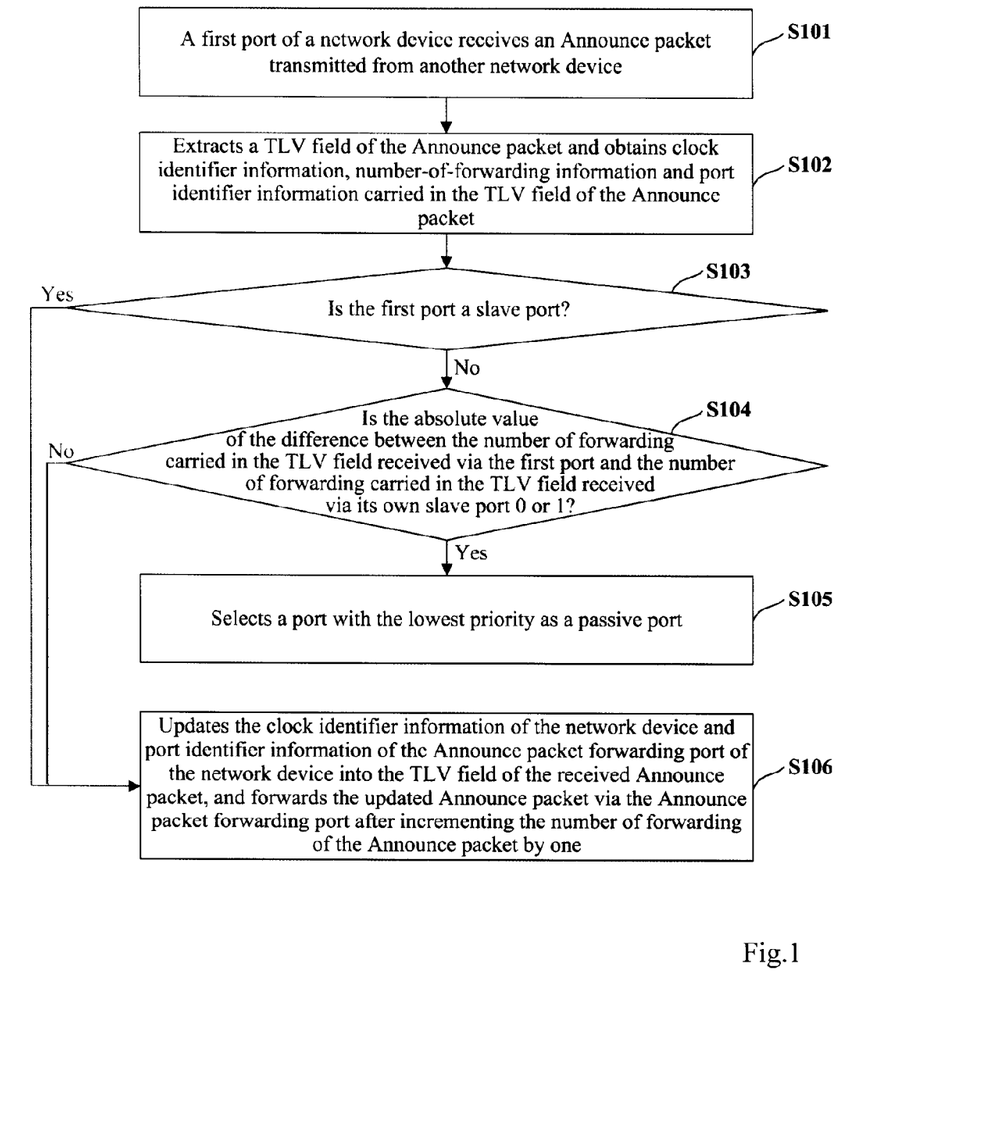
FIG. 1 is a schematic diagram of a process for selecting a passive port of a transparent clock node based on PTP according to the invention.

FIG. 1 is a schematic diagram of a process for selecting a passive port of a transparent clock node based on PTP according to the invention, where the selecting process includes the following steps.

S101: A first port of a network device receives an Announce packet transmitted from another network device, where a TLV field of the Announce packet carries clock identifier information, number-of-forwarding information and port identifier information.

In order to overcome the deficiency that in a complex topology network or a loop network including a plurality of transparent clock nodes, a transparent clock node performs only frequency synchronization without phase synchronization and consequently can not function as a master clock, the network device according to the invention adds comparison factors in the TLV field of the Announce packet, e.g., the clock identifier information, the number-of-forwarding information and the port identifier information, to compare data sets in respective transparent clock nodes, where the network device in the invention includes but will not be limited to a switcher, a router and other smart devices with transparent clock function.

S102: The TLV field of the Announce packet is extracted, and the clock identifier information, the number-of-forwarding information and the port identifier information carried in the TLV field are obtained.

The clock identifier information carried in the TLV field in the invention includes the priority of a clock identifier, the port identifier information includes the priority of a port identifier, and the number-of-forwarding information includes the number of times that the Announce packet has been forwarded through other transparent clock nodes in the complex topology network or the loop network, where the priority of the clock identifier is determined according to the ID and particular configuration of a local clock of the network device itself, and the priority of the port identifier is determined according to the ID and particular configuration of the port.

S103: It is judged whether the first port is a slave port, and if so, then the process proceeds to the step S106; otherwise, the process proceeds to the step S104.

In a method for selecting a slave port of the network device in the invention, the network device selects a port with the highest priority as the slave port according to number-of-forwarding information carried in TLV fields in Announce packets received via its own respective ports and identifier information of its own respective ports.

Particularly, the port with the highest priority as the slave port is selected by: comparing numbers of forwarding carried in the TLV fields in the Announce packets received via the respective ports, selecting a port with the lowest number of forwarding carried in the TLV field in the received Announce packet, judging whether there is a unique port with the lowest number of forwarding carried in the TLV field in the received Announce packet, and if it is judged that there is a unique port with the lowest number of forwarding carried in the TLV field in the received Announce packet, determining the port as the slave port;

otherwise, comparing the priorities in the port identifier information of the respective ports with the lowest numbers of forwarding carried in the TLV fields in the received Announce packets, and selecting a port with the highest priority as the slave port.

S104: It is judged whether the absolute value of the difference between the number of forwarding carried in the TLV field received via the first port and the number of forwarding carried in the TLV field received via its own slave port is 0 or 1, and if so, then the process proceeds to the step S105; otherwise, the process proceeds to the step S106.

S105: If it is judged that the absolute value of the difference between the number of forwarding carried in the TLV field received via the first port and the number of forwarding carried in the TLV field received via its own slave port is 0 or 1, a port with the lowest priority is selected as the passive port.

If it is judged that the absolute value of the difference between the number of forwarding carried in the TLV field received via the first port and the number of forwarding carried in the TLV field received via the slave port is 0, the first port is selected as the passive port; and If it is judged that the absolute value of the difference between the number of forwarding carried in the TLV field received via the first port and the number of forwarding carried in the TLV field received via the slave port is 1, the clock identifier information carried in the TIN field received via the first port is compared with clock identifier information of the network device, and If it is judged that the priority in the clock identifier information carried in the TLV field received via the first port is higher than the priority in the clock identifier information of the network device, the first port is selected as the passive port.

If it is judged that the priority in the clock identifier information carried in the TLV field received via the first port is not higher than the priority in the clock identifier information of the network device, the method further includes:

the clock identifier information of the network device and port identifier information of the Announce packet forwarding port of the network device are updated into the TLV field of the Announce packet, and the updated Announce packet is forwarded via the Announce packet forwarding port after the number of forwarding of the Announce packet is incremented by one.

S106: The clock identifier information of the network device and port identifier information of the Announce packet forwarding port of the network device are updated into the TLV field of the Announce packet, and the updated Announce packet is forwarded via the Announce packet forwarding port corresponding to the port identifier information after the number of forwarding of the Announce packet is incremented by one.

Particularly, after the network device receives the Announce packet transmitted from another device, the network device adds to a revision field of the Announce packet a period of time by which the Announce packet passing the network device is delayed (in the case that the network device is an E2E transparent clock, it calculates and adds its own staying period of time to the revision field of the packet, and in the case that the network device is a P2P transparent clock, it calculates and adds a point-to-point link delay and its own staying period of time to the revision field of the packet), updates its own clock identifier information and port identifier information of the forwarding port respectively into the clock identifier information and the port identifier information in the TLV field of the received Announce packet, increments the number of forwarding carried in the TLV field of the received Announce packet by one, and forwards the updated Announce packet via the Announce packet forwarding port corresponding to the port identifier information.

In the case that the Announce packet is initially transmitted from a boundary clock node to the complex topology network or the loop network including transparent clock nodes, the boundary clock node does not need to compare or update the information included in the TLV field of the Announce packet upon receiving or forwarding of the Announce packet, so the TLV field of the Announce packet carries no clock identifier information, number-of-forwarding information and port identifier information, and thus the TLV field of the Announce packet via the port of the network device in the complex topology network or the loop network carries no clock identifier information, number-of-forwarding information and port identifier information. Preferably in this case, the following process is performed before the slave port is selected.

In the case that it is judged that the TLV field of the Announce packet carries no clock identifier information, number-of-forwarding information and port identifier information, the Announce packet is parsed, clock ID identifier information carried in the Announce packet is obtained, the clock ID identifier information carried in the Announce packet is updated into the TLV field of the Announce packet as parent clock ID identifier information, clock identifier information of the network device and port identifier information of Announce packet forwarding port of the network device are updated respectively into the TLV field of the Announce packet as clock identifier information and port identifier information, the number of forwarding of the Announce packet is set to 1 in the TLV field, and the updated Announce packet is forwarded via all its own other ports than the passive port.

In the case that the TLV field of the Announce packet further carries the parent clock ID identifier information, in addition to updating the TLV field of the received Announce packet in the method according to the invention, the transparent clock node in the invention updates the revision field of the Announce packet by its own staying period of time and link delay of the Announce packet without modifying the clock ID identifier information of the Announce packet, and in the case that the Announce packet is transmitted to a network including a boundary clock node over the network including the transparent clock nodes, the boundary clock node updates the clock ID identifier information of the Announce packet without modifying the TLV field of the Announce packet, so after the Announce packet is further transmitted from the boundary clock node to another loop network including transparent clocks, the number-of-forwarding information carried in the TLV field of the Announce packet is incremented further to the performance done by a preceding transparent clock node, thus making a result of selecting a passive port inaccurate. In order to address this problem, the transparent clock node in the complex topology network or the loop network preferably further performs the following process before the salve port is selected.

It is judged whether the parent clock ID identifier information carried in the TLV field of the Announce packet received via the first port is consistent with the clock ID identifier information included in the Announce packet; and if it is judged that the parent clock ID identifier information carried in the TLV field of the Announce packet received via the first port is not consistent with the clock ID identifier information included in the Announce packet, the clock ID identifier information included in the Announce packet is updated into the TLV field of the Announce packet as parent clock ID identifier information, its own clock identifier information and port identifier information of its own Announce packet forwarding port are updated respectively into the TLV field of the Announce packet as clock identifier information and port identifier information, the number of forwarding of the Announce packet is set to 1 in the TLV field of the Announce packet, and the Announce packet is forwarded via the Announce packet forwarding port without judging any slave port.

Figure 2:
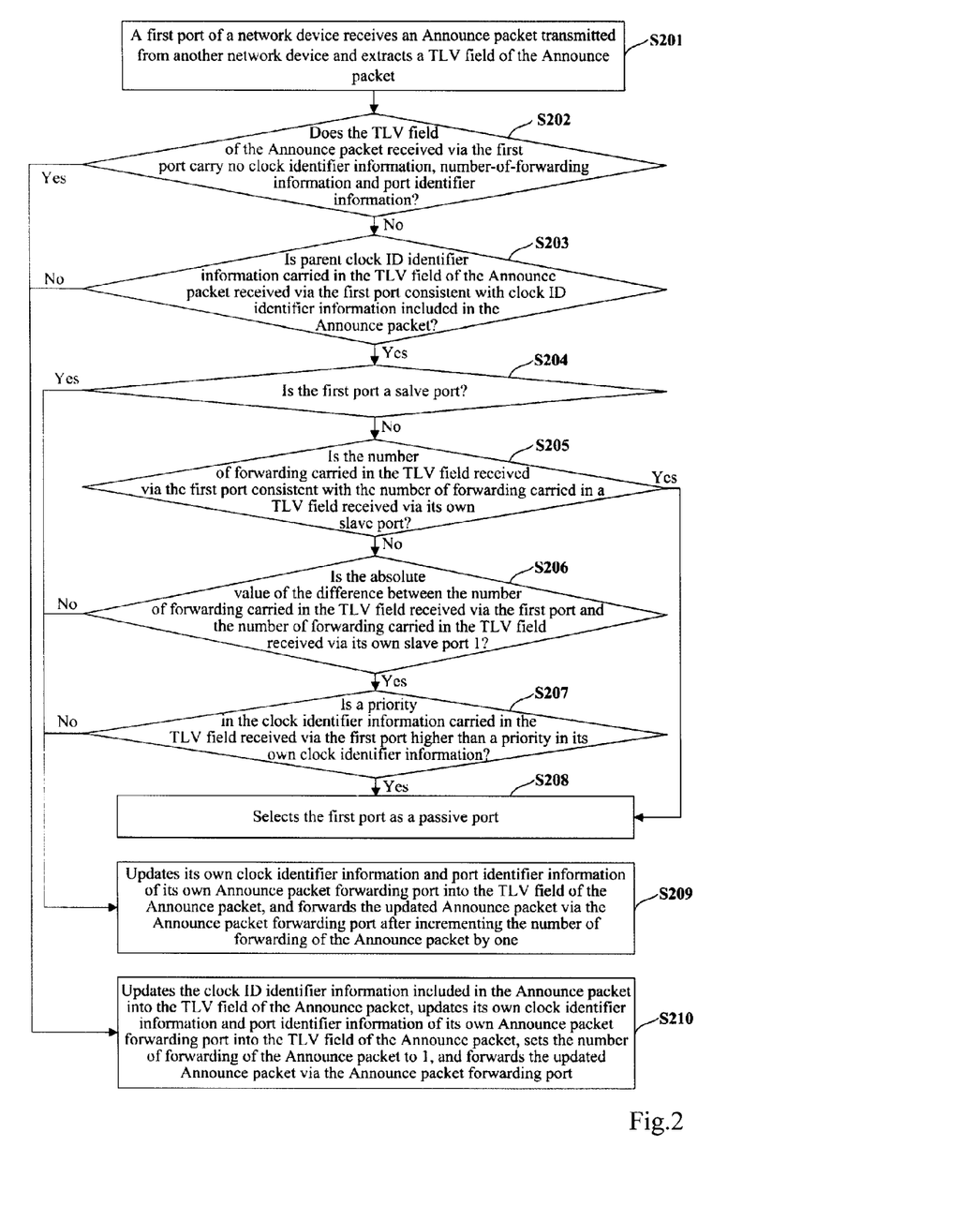
FIG. 2 is a schematic diagram of a detailed process for selecting a passive port of a transparent clock node based on PTP in a symmetric network according to the invention.

FIG. 2 is a schematic diagram of a detailed process for selecting a passive port of a transparent clock node based on PTP according to the invention, where the selecting process includes the following steps.

S201: A first port of a network device receives an Announce packet transmitted from another network device and extracts a TLV field of the Announce packet.

S202: It is judged whether the TLV field of the Announce packet received via the first port carries no clock identifier information, number-of-forwarding information and port identifier information, and if so, then the process proceeds to the step S210; otherwise, the process proceeds to the step S203.

S203: It is judged whether parent clock ID identifier information carried in the TLV field of the Announce packet received via the first port is consistent with clock ID identifier information included in the Announce packet, and if so, then the process proceeds to the step S204: otherwise, the process proceeds to the step S210.

S204: It is judged whether the first port is a slave port, and if so, then the process proceeds to the step S209; otherwise, the process proceeds to the step S205.

S205: It is judged whether the number of forwarding carried in the TLV field received via the first port is consistent with the number of forwarding carried in a TLV field received via its own slave port, and if so, then the process proceeds to the step S208; otherwise, the process proceeds to the step S206.

S206: It is judged whether the absolute value of the difference between the number of forwarding carried in the TLV field received via the first port and the number of forwarding carried in the TLV field received via its own slave port is 1, and if so, then the process proceeds to the step S207; otherwise, the process proceeds to the step S209.

S207: It is judged whether a priority in the clock identifier information carried in the TLV field received via the first port is higher than a priority in its own clock identifier information, and if so, then the process proceeds to the step S208; otherwise, the process proceeds to the step S209.

S208: The first port is selected as a passive port.

S209: Its own clock identifier information and port identifier information of its own Announce packet forwarding port are updated into the TLV field of the received Announce packet as clock identifier information and port identifier information, and the Announce packet is forwarded via the Announce packet forwarding port after the number of forwarding of the Announce packet is incremented by one.

S210: The clock ID identifier information included in the Announce packet is updated into the TLV field of the Announce packet as parent clock ID identifier information, its own clock identifier information and port identifier information of its own Announce packet forwarding port are updated respectively into the TLV field of the Announce packet as clock identifier information and port identifier information, the number of forwarding of the Announce packet is set to 1, and the Announce packet is forwarded via the Announce packet forwarding port.

Figure 3:
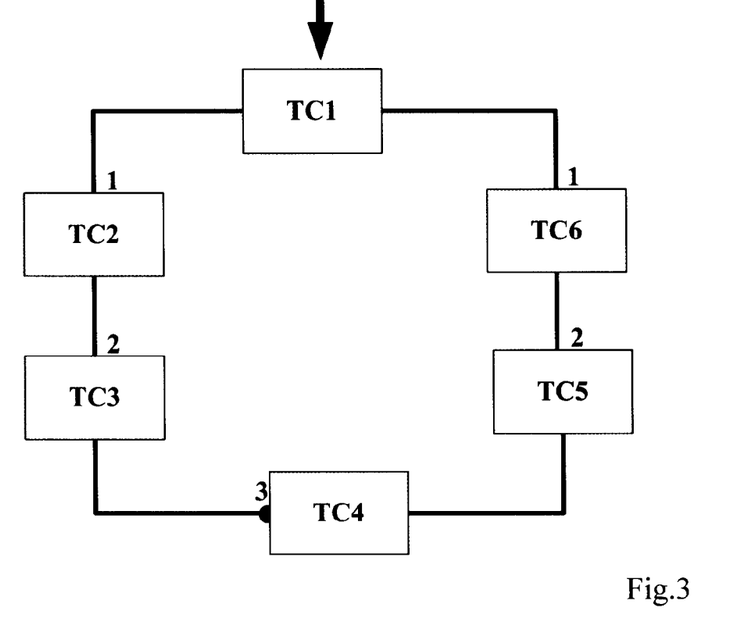
FIG. 3 is a structural diagram of a symmetric network to which the method for selecting a passive port of a transparent clock node based on PTP is applied according to the invention.

FIG. 3 is a structural diagram of a symmetric network to which the foregoing method for selecting a passive port of a transparent clock node based on PTP is applied according to the invention. In FIG. 3, singly present numerals represent the number of forwarding of the Announce packet. As illustrated, in a loop network including network devices TC1 to TC6 which are transparent clock nodes, a first port of the network device TC1 receives an Announce packet transmitted from an external network, extracts the TLV field of the Announce packet, judges whether the TLV field of the Announce packet carries no clock identifier information, number-of-forwarding information and port identifier information, and if so, then the first port parses the Announce packet, updates clock ID identifier information included in the Announce packet into the TLV field of the Announce packet as parent clock ID identifier information, the clock identifier information and port identifier information of a second port of the network device TC1 are updated respectively into the TLV field of the Announce packet as clock identifier information and port identifier information, and forwarding the Announce packet via the second port after the number of forwarding of the Announce packet is set to 1.

The network devices TC2 to TC6 receive the Announce packet forwarded through the other network devices in the loop network, extract the TLV field of the Announce packet, obtain the clock identifier information, the number-of-forwarding information and the port identifier information carried in the TLV field, and select a port with the lowest priority as the passive port according to the clock identifier information and the number-of-forwarding information carried in the TLV field, where a port illustrated as a black dot of the network device TC4 in the FIG. 3 is the passive port, so the protocol, particularly the Announce packet, is extended to enable the transparent clock node to support the PTP protocol so as to avoid a protocol storm in the complex topology network or the loop network including the transparent clock nodes due to the PTP packets and improve the stability of the network.

Figure 4:
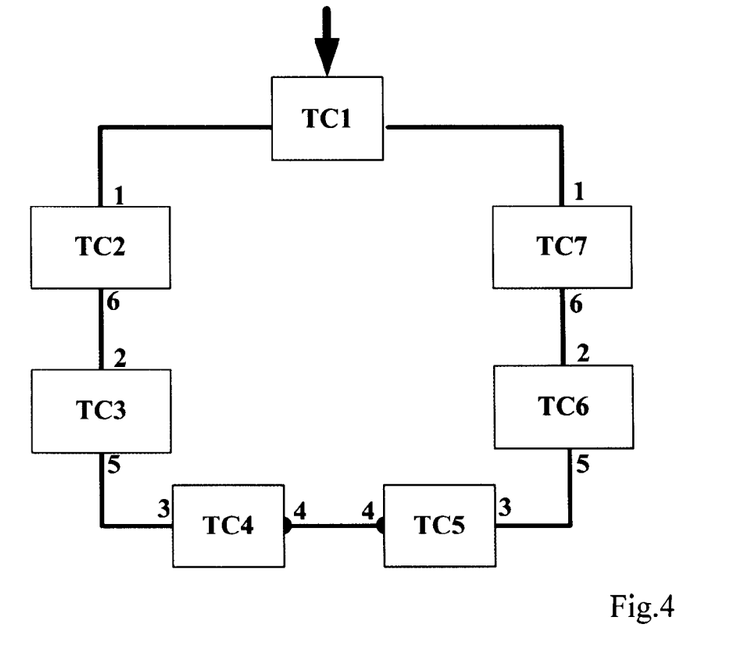
FIG. 4 is a structural diagram of an asymmetric network to which the method for selecting a passive port of a transparent clock node based on PTP is applied according to the invention.

FIG. 4 is a structural diagram of an asymmetric network to which the foregoing method for selecting a passive port of a transparent clock node based on PTP is applied according to the invention. In FIG. 4, singly present numerals represent the number of forwarding of the Announce packet. As illustrated, there is a difference of 1 between the numbers of forwarding of the two ports of the network devices TC4 and TC5, so if it is judged that the absolute value of the difference between the number of forwarding carried in the TLV field received via the first port and the number of forwarding carried in the TLV field received via its own second port is 1 in the method according to the invention, a port with the lowest priority in the clock identifier information is selected as the passive port, and thus the port of the network device TC4 connected with TC5 is a passive port in the asymmetric loop network including the transparent clocks.

Figure 5:
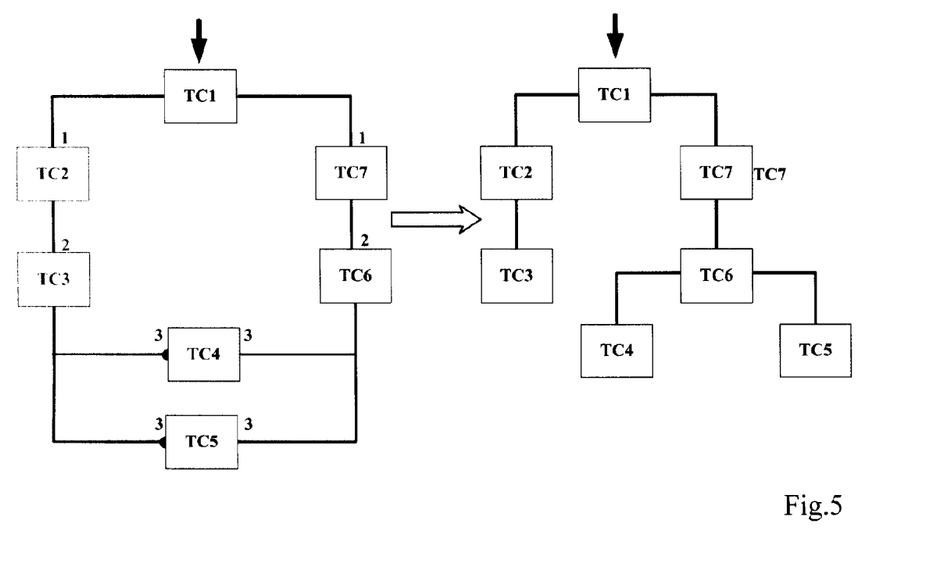
FIG. 5 is a structural diagram of a redundant network to which the method for selecting a passive port of a transparent clock node based on PTP is applied according to the invention.

FIG. 5 is a structural diagram of a redundant network to which the foregoing method for selecting a passive port of a transparent clock node based on PTP is applied according to the invention. In FIG. 5, singly present numerals represent the number of forwarding of the Announce packet. As illustrated, the network devices TC4 and TC5 are a redundant section of the loop network, and with the method for selecting a passive port of a transparent clock node according to the invention, the deployment structure of the loop network can be translated effectively into a tree-like deployment structure to thereby avoid a protocol storm in the loop network due to the PTP packets and improve the stability of the network.

Figure 6:
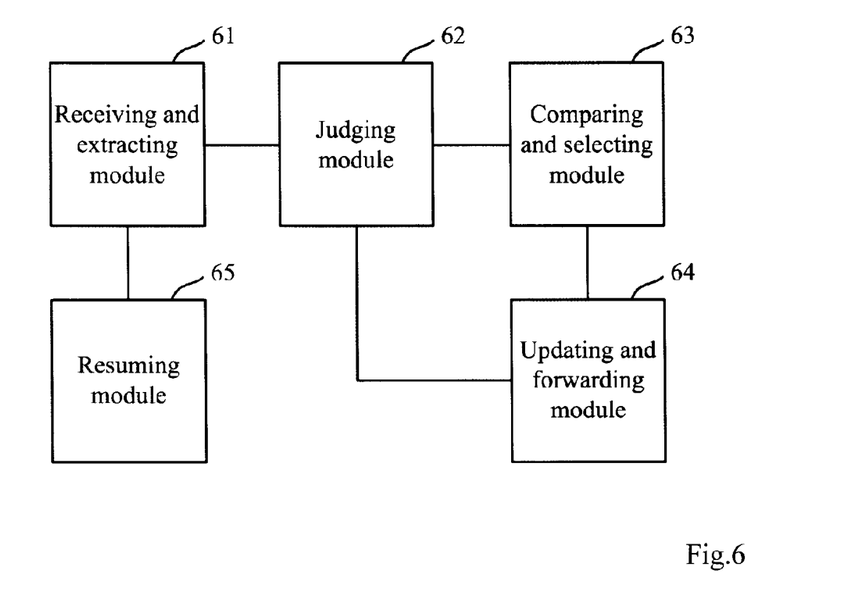
FIG. 6 is a structural diagram of an apparatus for selecting a passive port of a transparent clock node based on PTP according to the invention.

FIG. 6 is a structural diagram of an apparatus for selecting a passive port of a transparent clock node based on PTP according to the invention, where the selecting apparatus includes:

A receiving and extracting module 61 configured for a port of a network device to receive an Announce packet transmitted from another network device, to extract a TLV field of the Announce packet, and to obtain clock identifier information, number-of-forwarding information and port identifier information carried in the TLV field;

A judging module 62 configured to judge whether the port of the network device is a slave port;

A comparing and selecting module 63 configured, if the judging module 62 judges that the port of the network device is not a slave port, to compare the number of forwarding carried in the TLV field received via the port of the network device with the number of forwarding carried in a TLV field received via the slave port of the network device, and to select a port with the lowest priority as the passive port upon judging that the absolute value of the difference between the number of forwarding carried in the TLV field received via the port of the network device and the number of forwarding carried in the TLV field received via the slave port is 0 or 1; and An updating and forwarding module 64 configured, if the judging module 62 judges that the port of the network device is a slave port or the comparing and selecting module 63 judges that the absolute value of the said difference between the numbers of forwarding is not 0 or 1, to update clock identifier information of the network device and port identifier information of an Announce packet forwarding port of the network device into the TLV field of the received Announce packet respectively as clock identifier information and port identifier information, and to forward the updated Announce packet via the Announce packet forwarding port after the number of forwarding of the Announce packet is incremented by one.

The judging module 62 is further configured to judge whether the TLV field of the Announce packet received via the port of the network device carries no clock identifier information, number-of-forwarding information and port identifier information; and The updating and forwarding module 64 is further configured, if the judging module 62 judges that the TLV field of the Announce packet carries no clock identifier information, number-of-forwarding information and port identifier information, to parse the Announce packet, to obtain clock ID identifier information carried in the Announce packet, to update the clock ID identifier information carried in the Announce packet into the TLV field of the Announce packet as parent clock ID identifier information, to update the clock identifier information of the network device and the port identifier information of the Announce packet forwarding port of the network device into the TLV field of the Announce packet respectively as clock identifier information and port identifier information, to set the number of forwarding of the Announce packet to 1, and to forward the Announce packet via the Announce packet forwarding port.

The judging module 62 is further configured to judge whether parent clock ID identifier information carried in the TLV field of the Announce packet received via the port of the network device is consistent with clock ID identifier information included in the Announce packet; and The updating and forwarding module 64 is further configured, if the judging module 62 judges that the parent clock ID identifier information carried in the TLV field of the Announce packet received via the port of the network device is not consistent with the clock ID identifier information included in the Announce packet, to update the clock ID identifier information included in the Announce packet into the TLV field of the Announce packet as parent clock ID identifier information, to update the clock identifier information of the network device and the port identifier information of the Announce packet forwarding port of the network device into the TLV field of the Announce packet respectively as clock identifier information and port identifier information, to set the number of forwarding of the Announce packet to 1, and to forward the Announce packet via the Announce packet forwarding port.

The comparing and selecting module 63 is further configured for the network device to select a port with the highest priority as the slave port according to number-of-forwarding information carried in TLV fields in Announce packets received via respective ports of the network device and port identifier information of the respective ports of the network device, where the port identifier information includes the priority of a port.

The comparing and selecting module 63 is particularly configured to compare numbers of forwarding carried in the TLV fields in the Announce packets received via the respective ports, to select a port with the lowest number of forwarding carried in the TLV field in the received Announce packet, to judge whether there is a unique port with the lowest number of forwarding carried in the TLV field in the received Announce packet, and if it is judged that there is a unique port with the lowest number of forwarding carried in the TLV field in the received Announce packet, to select the port as a salve port; otherwise, to compare the priorities in the port identifier information of the respective ports with the lowest numbers of forwarding carried in the TLV fields in the received Announce packets, and to select a port with the highest priority as the slave port.

The comparing and selecting module 63 is further configured, if it is judged that the absolute value of the difference between the number of forwarding carried in the TLV field received via the port of the network device and the number of forwarding carried in the TLV field received via the slave port is 0, to select the port of the network device as the passive port.

The comparing and selecting module 63 is further configured, if it is judged that the absolute value of the difference between the number of forwarding carried in the TLV field received via the port of the network device and the number of forwarding carried in the TLV field received via the slave port is 1, to compare the clock identifier information carried in the TLV field received via the port of the network device with the clock identifier information of the network device, and if it is judged that a priority in the clock identifier information carried in the TLV field received via the port of the network device is higher than a priority in the clock identifier information of the network device, to select the port of the network device as the passive port, where the clock identifier information includes the priority of a clock identifier.

The updating and forwarding module 64 is further configured, if it is judged that the priority in the clock identifier information carried in the TLV field received via the port of the network device is not higher than the priority in the clock identifier information of the network device, to update the clock identifier information of the network device and the port identifier information of the Announce packet forwarding port of the network device into the TLV field of the Announce packet respectively as clock identifier information and port identifier information, and to forward the Announce packet via the Announce packet forwarding port after the number of forwarding of the Announce packet is incremented by one.

The selecting apparatus further includes:

A resuming module 65 configured to resume automatically the set passive port when a link becomes abnormal.

The invention provides a method and apparatus for selecting a passive port of a transparent clock node based on PTP, and a port of a network device in the method receives an Announce packet transmitted from another network device, extracts the TLV field of the Announce packet, and obtains clock identifier information, number-of-forwarding information and port identifier information carried in the TLV field; judges whether the port of the network device is a slave port; if it is judged that the port of the network device is not a slave port, the number of forwarding carried in the TLV field received via the port of the network device is compared with the number of forwarding carried in a TLV field received via the slave port of the network device, and if it is judged that the absolute value of the difference between the number of forwarding carried in the TLV field received via the port of the network device and the number of forwarding carried in the TLV field received via the slave port is 0 or 1, a port with the lowest priority is selected as the passive port; and if the port of the network device is a slave port or the absolute value of the difference between the numbers of forwarding is not 0 or 1, clock identifier information of the network device and port identifier information of an Announce packet forwarding port of the network device are updated into the TLV field of the Announce packet, and the updated Announce packet is forwarded via the Announce packet forwarding port after the number of forwarding of the Announce packet is incremented by one. A port of a network device in the invention extracts a TLV field of a received Announce packet and obtains clock identifier information, number-of-forwarding information and port identifier information carried in the TLV field; and compares the number-of-forwarding information and the clock identifier information carried in the TLV field respectively with number-of-forwarding information carried in a TLV field included in an Announce packet received via the slave port of the network device and clock identifier information of the network device, to thereby select a passive port, so the clock identifier information, the number-of-forwarding information and the port identifier information are added to the TLV field of the Announce packet as comparison factors to enable a transparent clock node to support the PTP so as to avoid a protocol storm in a complex topology network or a loop network including transparent clocks due to the PTP packets and improve the stability of the network.

The foregoing description illustrates and describes preferred embodiments of the invention, but as described above, it shall be appreciated that the invention will not be limited to the disclosure of this context and shall not be construed as precluding other embodiments but can be practiced in various other combinations, variations and environments and can be modified in light of the foregoing teaching or skills or knowledge in the art without departing from the scope of the invention. Any modifications and variations made by those skilled in the art without departing from the scope of the invention shall come into the scope of the appended claims of the invention.

The invention claimed is:

1. A method for selecting a passive port of a transparent clock node based on PTP, comprising:

a port of a network device receiving an Announce packet transmitted from another network device, extracting a TLV field of the Announce packet, and obtaining clock identifier information, number-of-forwarding information and port identifier information carried in the TLV field, wherein the network device are provided with at least two ports;

judging whether the port of the network device is a slave port;

if it is judged that the port of the network device is not a slave port, comparing the number of forwarding carried in the TLV field received via the port of the network device with the number of forwarding carried in a TLV field received via the slave port of the network device, and if it is judged that the absolute value of the difference between the number of forwarding carried in the TLV field received via the port of the network device and the number of forwarding carried in the TLV field received via the slave port is 0 or 1, selecting a port with the lowest priority as the passive port; and if the port of the network device is a slave port or the absolute value of the said difference between the numbers of forwarding is not 0 or 1, updating clock identifier information of the network device and port identifier information of an Announce packet forwarding port of the network device into the TLV field of the received Announce packet respectively as clock identifier information and port identifier information, and forwarding the updated Announce packet via the Announce packet forwarding port after incrementing the number of forwarding of the Announce packet by one.

2. The method according to claim 1, wherein before obtaining the clock identifier information, the number-of-forwarding information and the port identifier information carried in the TLV field, the method further comprises:

judging whether the TLV field of the Announce packet received via the port of the network device carries no clock identifier information, number-of-forwarding information and port identifier information; and if it is judged that the TLV field of the Announce packet carries no clock identifier information, number-of-forwarding information and port identifier information, parsing the Announce packet, obtaining clock ID identifier information carried in the Announce packet, updating the clock ID identifier information carried in the Announce packet into the TLV field of the Announce packet as parent clock ID identifier information, updating the clock identifier information of the network device and the port identifier information of the Announce packet forwarding port of the network device into the TLV field of the Announce packet respectively as clock identifier information and port identifier information, setting the number of forwarding of the Announce packet to 1, and forwarding the Announce packet via the Announce packet forwarding port.

3. The method according to claim 2, wherein the TLV field further carries parent clock ID identifier information; and before comparing the number of forwarding carried in the TLV field received via the port of the network device with the number of forwarding carried in the TLV field received via the slave port of the network device, the method further comprises:

judging whether the parent clock ID identifier information carried in the TLV field of the Announce packet received via the port of the network device is consistent with clock ID identifier information included in the Announce packet; and if it is judged that the parent clock ID identifier information carried in the TLV field of the Announce packet received via the port of the network device is not consistent with the clock ID identifier information included in the Announce packet, updating the clock ID identifier information included in the Announce packet into the TLV field of the Announce packet as parent clock ID identifier information, updating the clock identifier information of the network device and the port identifier information of the Announce packet forwarding port of the network device into the TLV field of the Announce packet respectively as clock identifier information and port identifier information, setting the number of forwarding in the TLV field of the Announce packet to 1, and forwarding the Announce packet via the Announce packet forwarding port.

4. The method according to claim 1, wherein the TLV field further carries parent clock ID identifier information; and before comparing the number of forwarding carried in the TLV field received via the port of the network device with the number of forwarding carried in the TLV field received via the slave port of the network device, the method further comprises:

judging whether the parent clock ID identifier information carried in the TLV field of the Announce packet received via the port of the network device is consistent with clock ID identifier information included in the Announce packet; and if it is judged that the parent clock ID identifier information carried in the TLV field of the Announce packet received via the port of the network device is not consistent with the clock ID identifier information included in the Announce packet, updating the clock ID identifier information included in the Announce packet into the TLV field of the Announce packet as parent clock ID identifier information, updating the clock identifier information of the network device and the port identifier information of the Announce packet forwarding port of the network device into the TLV field of the Announce packet respectively as clock identifier information and port identifier information, setting the number of forwarding in the TLV field of the Announce packet to 1, and forwarding the Announce packet via the Announce packet forwarding port.

5. The method according to claim 1, wherein judging whether the port of the network device is a slave port comprises:

the network device selecting a port with the highest priority as the slave port according to number-of-forwarding information carried in TLV fields in Announce packets received via respective ports of the network device and port identifier information of the respective ports of the network device, wherein the port identifier information comprises the priority of a port; and wherein selecting the port with the highest priority as the slave port comprises:

comparing numbers of forwarding carried in the TLV fields in the Announce packets received via the respective ports of the network device, selecting a port with the lowest number of forwarding carried in the TLV field in the received Announce packet, and judging whether there is a unique port with the lowest number of forwarding carried in the TLV field in the received Announce packet; and if it is judged that there is a unique port with the lowest number of forwarding carried in the TLV field in the received Announce packet, selecting the port as the salve port;

otherwise, comparing the priorities in the port identifier information of the respective ports with the lowest numbers of forwarding carried in the TLV fields in the received Announce packets, and selecting a port with the highest priority as the slave port.

6. The method according to claim 5, wherein selecting the port with the lowest priority as the passive port comprises:

if it is judged that the absolute value of the difference between the number of forwarding carried in the TLV field received via the port of the network device and the number of forwarding carried in the TLV field received via the slave port is 0, selecting the port of the network device as the passive port; and if it is judged that the absolute value of the difference between the number of forwarding carried in the TLV field received via the port of the network device and the number of forwarding carried in the TLV field received via the slave port is 1, comparing the clock identifier information carried in the TLV field received via the port of the network device with the clock identifier information of the network device, and if it is judged that a priority in the clock identifier information carried in the TLV field received via the port of the network device is higher than a priority in the clock identifier information of the network device, selecting the port of the network device as the passive port, wherein the clock identifier information comprises the priority of a clock identifier, and if it is judged that the priority in the clock identifier information carried in the TLV field received via the port of the network device is not higher than the priority in the clock identifier information of the network device, updating the clock identifier information of the network device and the port identifier information of the Announce packet forwarding port of the network device into the TLV field of the Announce packet respectively as clock identifier information and port identifier information, and forwarding the Announce packet via the Announce packet forwarding port after incrementing the number of forwarding of the Announce packet by one.

7. An apparatus for selecting a passive port of a transparent clock node based on PTP, comprising:
a memory; and
one or more processors coupled to the memory, wherein:
the memory is configured to store computer readable program codes, and the one or more processors execute the computer readable program codes to implement:
a receiving and extracting module configured for a port of a network device to receive an Announce packet transmitted from another network device, to extract a TLV field of the Announce packet, and to obtain clock identifier information, number-of-forwarding information and port identifier information carried in the TLV field;
a judging module configured to judge whether the port of the network device is a slave port;
a comparing and selecting module configured, if it is judged that the port of the network device is not a slave port, to compare the number of forwarding carried in the TLV field received via the port of the network device with the number of forwarding carried in a TLV field received via the slave port of the network device, and to select a port with the lowest priority as the passive port upon judging that the absolute value of the difference between the number of forwarding carried in the TLV field received via the port of the network device and the number of forwarding carried in the TLV field received via the slave port is 0 or 1; and
an updating and forwarding module configured, if the port of the network device is a slave port or the absolute value of the said difference between the numbers of forwarding is not 0 or 1, to update clock identifier information of the network device and port identifier information of an Announce packet forwarding port of the network device into the TLV field of the received Announce packet respectively as clock identifier information and port identifier information, and to forward the updated Announce packet via the Announce packet forwarding port after incrementing the number of forwarding of the Announce packet by one.

8. The apparatus according to claim 7, wherein the judging module is further configured to judge whether the TLV field of the Announce packet received via the port of the network device carries no clock identifier information, number-of-forwarding information and port identifier information; and
the updating and forwarding module is further configured, if it is judged that the TLV field of the Announce packet carries no clock identifier information, number-of-forwarding information and port identifier information, to parse the Announce packet, to obtain clock ID identifier information carried in the Announce packet, to update the clock ID identifier information carried in the Announce packet into the TLV field of the Announce packet as parent clock ID identifier information, to update the clock identifier information of the network device and the port identifier information of the Announce packet forwarding port of the network device into the TLV field of the Announce packet respectively as clock identifier information and port identifier information, to set the number of forwarding of the Announce packet to 1, and to forward the updated Announce packet via the Announce packet forwarding port.

9. The apparatus according to claim 8, wherein the judging module is further configured to judge whether parent clock ID identifier information carried in the TLV field of the Announce packet received via the port of the network device is consistent with clock ID identifier information included in the Announce packet; and
the updating and forwarding module is further configured, if it is judged that the parent clock ID identifier information carried in the TLV field of the Announce packet received via the port of the network device is not consistent with the clock ID identifier information included in the Announce packet, to update the clock ID identifier information included in the Announce packet into the TLV field of the Announce packet as parent clock ID identifier information, to update the clock identifier information of the network device and the port identifier information of the Announce packet forwarding port of the network device into the TLV field of the Announce packet respectively as clock identifier information and port identifier information, to set the number of forwarding of the Announce packet to 1, and to forward the updated Announce packet via the Announce packet forwarding port.

10. The apparatus according to claim 7, wherein the judging module is further configured to judge whether parent clock ID identifier information carried in the TLV field of the Announce packet received via the port of the network device is consistent with clock ID identifier information included in the Announce packet; and
the updating and forwarding module is further configured, if it is judged that the parent clock ID identifier information carried in the TLV field of the Announce packet received via the port of the network device is not consistent with the clock ID identifier information included in the Announce packet, to update the clock ID identifier information included in the Announce packet into the TLV field of the Announce packet as parent clock ID identifier information, to update the clock identifier information of the network device and the port identifier information of the Announce packet forwarding port of the network device into the TLV field of the Announce packet respectively as clock identifier information and port identifier information, to set the number of forwarding of the Announce packet to 1, and to forward the updated Announce packet via the Announce packet forwarding port.

11. The apparatus according to claim 7, wherein the comparing and selecting module is further configured for the network device to select a port with the highest priority as a slave port according to number-of-forwarding information carried in TLV fields in Announce packets received via respective ports of the network device and port identifier information of the respective ports of the network device, wherein the port identifier information comprises the priority of a port; and
the comparing and selecting module is further configured to compare numbers of forwarding carried in the TLV fields in the Announce packets received via the respective ports, to select a port with the lowest number of forwarding carried in the TLV field in the received Announce packet, to judge whether there is a unique port with the lowest number of forwarding carried in the TLV field in the received Announce packet, and if it is judged that there is a unique port with the lowest number of forwarding carried in the TLV field in the received Announce packet, to select the port as the slave port; otherwise, to compare the priorities in the port identifier information of the respective ports with the lowest numbers of forwarding carried in the TLV fields in the received Announce packets, and to select a port with the highest priority as the slave port.

12. The apparatus according to claim 11, wherein the comparing and selecting module is further configured, if it is judged that the absolute value of the difference between the number of forwarding carried in the TLV field received via the port of the network device and the number of forwarding carried in the TLV field received via the slave port is 0, to select the port of the network device as the passive port;

the comparing and selecting module is further configured, if it is judged that the absolute value of the difference between the number of forwarding carried in the TLV field received via the port of the network device and the number of forwarding carried in the TLV field received via the slave port is 1, to compare the clock identifier information carried in the TLV field received via the port of the network device with the clock identifier information of the network device, and if it is judged that a priority in the clock identifier information carried in the TLV field received via the port of the network device is higher than a priority in the clock identifier information of the network device, to select the port of the network device as the passive port, wherein the clock identifier information comprises the priority of a clock identifier; and the updating and forwarding module is further configured, if it is judged that the priority in the clock identifier information carried in the TLV field received via the port of the network device is not higher than the priority in the clock identifier information of the network device, to update the clock identifier information of the network device and the port identifier information of the Announce packet forwarding port of the network device into the TLV field of the Announce packet respectively as clock identifier information and port identifier information, and to forward the updated Announce packet via the Announce packet forwarding port after incrementing the number of forwarding of the Announce packet by one.

\* \* \* \* \*